US012675968B2

(12) United States Patent
Mallinger et al.

(10) Patent No.: US 12,675,968 B2
(45) Date of Patent: Jul. 7, 2026

(54) DYNAMIC REGION OF INTEREST IDENTIFICATION FOR VEHICLES

(71) Applicant: GM Global Technology Operations LLC, Detroit, MI (US)

(72) Inventors: Philip Mallinger, Shelby Township, MI (US); Jason R. Ekelmann, Royal Oak, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

(21) Appl. No.: 18/432,559

(22) Filed: Feb. 5, 2024

(65) Prior Publication Data

US 2025/0252701 A1     Aug. 7, 2025

(51) Int. Cl.
| | |
|---|---|
| *G06V 10/25* | (2022.01) |
| *G06T 3/4053* | (2024.01) |
| *G06V 20/58* | (2022.01) |
| *G08G 1/04* | (2006.01) |
| *G08G 1/16* | (2006.01) |

(52) U.S. Cl.
CPC ............ *G06V 10/25* (2022.01); *G06T 3/4053* (2013.01); *G06V 20/58* (2022.01); *G08G 1/04* (2013.01); *G08G 1/16* (2013.01); *G06T 2207/30252* (2013.01)

(58) Field of Classification Search
CPC ...... G06V 10/25; G06V 20/58; G06T 3/4053; G06T 2207/30252; G08G 1/04; G08G 1/16
See application file for complete search history.

(56) References Cited

U.S. PATENT DOCUMENTS

| | | | | |
|---|---|---|---|---|
| 10,611,378 | B2 * | 4/2020 | Michalakis | ........... B60W 30/09 |
| 10,661,790 | B2 * | 5/2020 | Kang | ..................... B60W 10/20 |
| 11,562,501 | B1 * | 1/2023 | Liu | ............................. G06T 7/30 |
| 12,455,165 | B2 * | 10/2025 | Kellner | ................. G01S 13/867 |
| 2018/0024568 | A1 * | 1/2018 | Fridman | ................... G06T 7/12 |
| | | | | 701/28 |
| 2019/0025433 | A1 * | 1/2019 | Yang | ........................ G01S 17/93 |
| 2019/0205675 | A1 * | 7/2019 | McGill | ................. B60W 40/04 |
| 2020/0225662 | A1 * | 7/2020 | Dev | ......................... G06N 3/045 |
| 2021/0018917 | A1 * | 1/2021 | Levandowski | ........ G06N 20/00 |
| 2021/0103285 | A1 * | 4/2021 | Philbin | .................. G05D 1/617 |
| 2021/0309221 | A1 * | 10/2021 | Alpert | .................. G06V 20/597 |
| 2021/0325902 | A1 * | 10/2021 | Wood | ................. B62D 15/0265 |
| 2022/0055549 | A1 * | 2/2022 | Bradley | ................... G06N 5/04 |
| 2022/0185324 | A1 * | 6/2022 | Lee | .......................... G01S 17/42 |
| 2022/0327317 | A1 * | 10/2022 | Kim | ........................ G06N 3/045 |
| 2024/0044669 | A1 * | 2/2024 | Jang | ................... G01C 21/3841 |
| 2024/0127062 | A1 * | 4/2024 | Muller | ................ B60W 30/095 |
| 2025/0010823 | A1 * | 1/2025 | Imai | ........................ B60T 8/172 |
| 2025/0115247 | A1 * | 4/2025 | Cho | ..................... G06V 20/588 |

* cited by examiner

*Primary Examiner* — Abdalla A Khaled
(74) *Attorney, Agent, or Firm* — Vivacqua Crane, PLLC

(57) ABSTRACT

A method for identifying a region of interest in an environment surrounding a vehicle may include receiving interest data using a first vehicle sensor. The interest data includes a first measurement. The method further may include determining an intended path of the vehicle. The method further may include identifying the region of interest in the environment surrounding the vehicle based at least in part on at least one of: the interest data and the intended path of the vehicle. The method further may include performing a second measurement of the region of interest using a second vehicle sensor.

13 Claims, 4 Drawing Sheets

218a

218 capture first image
of environment
surrounding vehicle — 402 determine priority
level of region
of interest — 404

406 — priority level
high?

408 — first
image resolution eq.
max. resolution?

410 — cache first image
in controller
media generate upscaled
image of
environment

— 412 capture second
image of
environment (hi-res) — 414

DYNAMIC REGION OF INTEREST IDENTIFICATION FOR VEHICLES

INTRODUCTION

The present disclosure relates to systems and methods for identifying a region of interest in an environment surrounding a vehicle.

To increase occupant awareness and convenience, vehicles may be equipped with advanced driver assistance systems (ADAS) and/or automated driving systems (ADS). ADAS and ADS systems may use various sensors such as cameras, radar, and LiDAR to detect and identify objects around the vehicle, including other vehicles, pedestrians, road configurations, traffic signs, and road markings. ADAS and ADS systems may take actions based on environmental conditions surrounding the vehicle, such as applying brakes or alerting an occupant of the vehicle. However, the various sensors employed by ADAS and ADS systems may produce large amounts of data about the entire environment surrounding the vehicle without regard for an importance of some parts of the environment over other parts of the environment.

Thus, while ADAS and ADS systems and methods achieve their intended purpose, there is a need for a new and improved system and method for identifying a region of interest in an environment surrounding a vehicle.

SUMMARY

According to several aspects, a method for identifying a region of interest in an environment surrounding a vehicle is provided. The method may include receiving interest data using a first vehicle sensor. The interest data includes a first measurement. The method further may include determining an intended path of the vehicle. The method further may include identifying the region of interest in the environment surrounding the vehicle based at least in part on at least one of: the interest data and the intended path of the vehicle. The method further may include performing a second measurement of the region of interest using a second vehicle sensor.

In another aspect of the present disclosure, receiving interest data further may include performing the first measurement of the environment surrounding the vehicle with the first vehicle sensor. The first vehicle sensor includes at least one of: a radar sensor and a light detection and ranging (LIDAR) sensor.

In another aspect of the present disclosure, identifying the region of interest in the environment surrounding the vehicle further may include identifying an object of interest in the environment surrounding the vehicle based at least in part on the first measurement. Identifying the region of interest in the environment surrounding the vehicle further may include determining a predicted path of the object of interest based at least in part on the first measurement. Identifying the region of interest in the environment surrounding the vehicle further may include calculating a time-to-collision of the object of interest with the vehicle based at least in part on the predicted path of the object of interest. Identifying the region of interest in the environment surrounding the vehicle further may include determining a probability of collision based at least in part on the predicted path of the object of interest, an uncertainty of the predicted path of the object of interest, and the time-to-collision of the object of interest with the vehicle. Identifying the region of interest in the environment surrounding the vehicle further may include identifying the region of interest to include the object of interest in response to determining that the probability of collision is greater than or equal to a predetermined collision probability threshold.

In another aspect of the present disclosure, determining the intended path of the vehicle further may include receiving one or more occupant inputs from an occupant of the vehicle using one or more vehicle input devices. Determining the intended path of the vehicle further may include performing one or more vehicle dynamics measurements with one or more vehicle dynamics sensors. Determining the intended path of the vehicle further may include determining a location of the vehicle using a global navigation satellite system (GNSS). Determining the intended path of the vehicle further may include determining the intended path of the vehicle based at least in part on at least one of: the one or more occupant inputs, the one or more vehicle dynamics measurements, and the location of the vehicle.

In another aspect of the present disclosure, identifying the region of interest in the environment surrounding the vehicle further may include identifying the region of interest in the environment surrounding the vehicle. The region of interest includes at least a portion of the intended path of the vehicle.

In another aspect of the present disclosure, receiving interest data further may include receiving one or more region cues from a remote server system. The first measurement is the one or more region cues.

In another aspect of the present disclosure, identifying the region of interest in the environment surrounding the vehicle further may include identifying the region of interest in the environment surrounding the vehicle based at least in part on the one or more region cues. The one or more region cues includes a location of a missing map element from the remote server system.

In another aspect of the present disclosure, identifying the region of interest in the environment surrounding the vehicle further may include identifying the region of interest in the environment surrounding the vehicle based at least in part on the one or more region cues. The one or more region cues includes at least one crowdsourced region of interest parameter. The at least one crowdsourced region of interest parameter is determined by the remote server system using crowdsourcing.

In another aspect of the present disclosure, performing the second measurement of the region of interest using the second vehicle sensor further may include capturing a first image of the environment surrounding the vehicle using the second vehicle sensor. The first image has a first image resolution. The first image includes at least the region of interest. The second vehicle sensor is a camera. Performing the second measurement of the region of interest using the second vehicle sensor further may include determining a priority level of the region of interest. The priority level includes at least one of: a high priority level and a low priority level. Performing the second measurement of the region of interest using the second vehicle sensor further may include caching the first image in a non-transitory memory in response to determining that the priority level is the low priority level. Performing the second measurement of the region of interest using the second vehicle sensor further may include generating a second image of the environment surrounding the vehicle in response to determining that the priority level is the high priority level.

In another aspect of the present disclosure, the second image of the environment includes the region of interest. The second image of the environment is upscaled using a machine learning super resolution algorithm.

According to several aspects, a system for identifying a region of interest in an environment surrounding a vehicle is provided. The system may include a first vehicle sensor. The system further may include a second vehicle sensor. The system further may include a vehicle controller in electrical communication with the first vehicle sensor and the second vehicle sensor. The vehicle controller is programmed to receive interest data using the first vehicle sensor. The vehicle controller is further programmed to identify the region of interest in the environment surrounding the vehicle based at least in part on the interest data. The vehicle controller is further programmed to perform a second measurement of the region of interest using the second vehicle sensor.

In another aspect of the present disclosure, the first vehicle sensor includes a perception sensor. To receive interest data using the first vehicle sensor, the vehicle controller is further programmed to perform a first measurement using the perception sensor. The interest data is the first measurement.

In another aspect of the present disclosure, to identify the region of interest in the environment surrounding the vehicle, the vehicle controller is further programmed to identify an object of interest in the environment surrounding the vehicle based at least in part on the first measurement. To identify the region of interest in the environment surrounding the vehicle, the vehicle controller is further programmed to determine a predicted path of the object of interest based at least in part on the first measurement. To identify the region of interest in the environment surrounding the vehicle, the vehicle controller is further programmed to calculate a time-to-collision of the object of interest with the vehicle based at least in part on the predicted path of the object of interest. To identify the region of interest in the environment surrounding the vehicle, the vehicle controller is further programmed to determine a probability of collision based at least in part on an uncertainty of the predicted path of the object of interest and the time-to-collision of the object of interest with the vehicle. To identify the region of interest in the environment surrounding the vehicle, the vehicle controller is further programmed to identify the region of interest to include the object of interest in response to determining that the probability of collision is greater than or equal to a predetermined collision probability threshold.

In another aspect of the present disclosure, the first vehicle sensor is a vehicle communication system. To receive interest data using the first vehicle sensor, the vehicle controller is further programmed to receive one or more region cues from a remote server system using the vehicle communication system. The interest data is the one or more region cues. To receive interest data using the first vehicle sensor, the vehicle controller is further programmed to transmit at least one vehicle region of interest parameter to the remote server system using the vehicle communication system for crowdsourcing by the remote server system.

In another aspect of the present disclosure, to identify the region of interest, the vehicle controller is further programmed to identify the region of interest in the environment surrounding the vehicle based at least in part on the one or more region cues. The one or more region cues includes a location of a missing map element from the remote server system. To identify the region of interest, the vehicle controller is further programmed to identify the region of interest in the environment surrounding the vehicle based at least in part on the one or more region cues. The one or more region cues includes at least one crowdsourced region of interest parameter. The at least one crowdsourced region of interest parameter is determined by the remote server system using crowdsourcing.

In another aspect of the present disclosure, the second vehicle sensor includes a camera. To perform the second measurement of the region of interest using the second vehicle sensor, the vehicle controller is further programmed to capture a first image of the environment surrounding the vehicle using the camera. The first image has a first image resolution. The first image includes at least the region of interest. To perform the second measurement of the region of interest using the second vehicle sensor, the vehicle controller is further programmed to determine a priority level of the region of interest. The priority level includes at least one of: a high priority level and a low priority level. To perform the second measurement of the region of interest using the second vehicle sensor, the vehicle controller is further programmed to cache the first image in a non-transitory memory of the vehicle controller in response to determining that the priority level is the low priority level. To perform the second measurement of the region of interest using the second vehicle sensor, the vehicle controller is further programmed to generate a second image of the environment surrounding the vehicle in response to determining that the priority level is the high priority level.

In another aspect of the present disclosure, the system further includes a vehicle graphics processing unit (GPU) in electrical communication with the vehicle controller. To generate the second image of the environment surrounding the vehicle, the vehicle controller is further programmed to compare the first image resolution to a maximum image resolution of the camera. To generate the second image of the environment surrounding the vehicle, the vehicle controller is further programmed to generate an upscaled image of the environment surrounding the vehicle in response to determining that the first image resolution is equal to the maximum image resolution of the camera. The upscaled image includes the region of interest. The upscaled image of the environment is upscaled using a machine learning super resolution algorithm executed using the vehicle GPU. To generate the second image of the environment surrounding the vehicle, the vehicle controller is further programmed to capture a high-resolution image of the environment surrounding the vehicle in response to determining that the first image resolution is less than the maximum image resolution of the camera. The high-resolution image includes the region of interest. The high-resolution image of the environment has a second image resolution. The second image resolution is greater than the first image resolution.

According to several aspects, a method for identifying a region of interest in an environment surrounding a vehicle is provided. The method may include performing a first measurement of the environment surrounding the vehicle using a first vehicle sensor. The first vehicle sensor is a perception sensor including at least one of: a radar sensor and a light detection and ranging (LIDAR) sensor. The method further may include identifying the region of interest in the environment surrounding the vehicle based at least in part on the first measurement. The method further may include performing a second measurement of the region of interest using a second vehicle sensor. The second vehicle sensor is a camera. The method further may include performing a data processing task based at least in part on the second measurement.

In another aspect of the present disclosure, identifying the region of interest in the environment surrounding the vehicle further may include identifying an object of interest in the environment surrounding the vehicle based at least in part on the first measurement. Identifying the region of interest in the environment surrounding the vehicle further may include determining a predicted path of the object of interest based at least in part on the first measurement. Identifying the region of interest in the environment surrounding the vehicle further may include calculating a time-to-collision of the object of interest with the vehicle based at least in part on the predicted path of the object of interest. Identifying the region of interest in the environment surrounding the vehicle further may include determining a probability of collision based at least in part on an uncertainty of the predicted path of the object of interest and the time-to-collision of the object of interest with the vehicle. Identifying the region of interest in the environment surrounding the vehicle further may include identifying the region of interest to include the object of interest in response to determining that the probability of collision is greater than or equal to a predetermined collision probability threshold.

In another aspect of the present disclosure, performing the second measurement of the region of interest using the second vehicle sensor further may include capturing a first image of the environment surrounding the vehicle using the camera. The first image has a first image resolution. The first image includes at least the region of interest. Performing the second measurement of the region of interest using the second vehicle sensor further may include comparing the first image resolution to a maximum image resolution of the camera. Performing the second measurement of the region of interest using the second vehicle sensor further may include generating an upscaled image of the environment surrounding the vehicle in response to determining that the first image resolution is equal to the maximum image resolution of the camera. The upscaled image includes the region of interest. The upscaled image of the environment is upscaled using a machine learning super resolution algorithm. Performing the second measurement of the region of interest using the second vehicle sensor further may include capturing a high-resolution image of the environment surrounding the vehicle in response to determining that the first image resolution is less than the maximum image resolution of the camera. The high-resolution image includes the region of interest. The high-resolution image of the environment has a second image resolution. The second image resolution is greater than the first image resolution.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, certain regions of an environment surrounding a vehicle may be more important than other regions for purposes of object detection, collision avoidance, driver assistance features and/or the like. For example, regions including lane markings, road signs, and/or the like are highly relevant for object detection and driver assistance features. Regions including threats such as objects or vehicles on a collision path are highly relevant to collision avoidance. Therefore, the present disclosure provides a new and improved system and method for identifying a region of interest in an environment surrounding a vehicle and providing additional or enhanced measurements of the region of interest.

Figure 1:
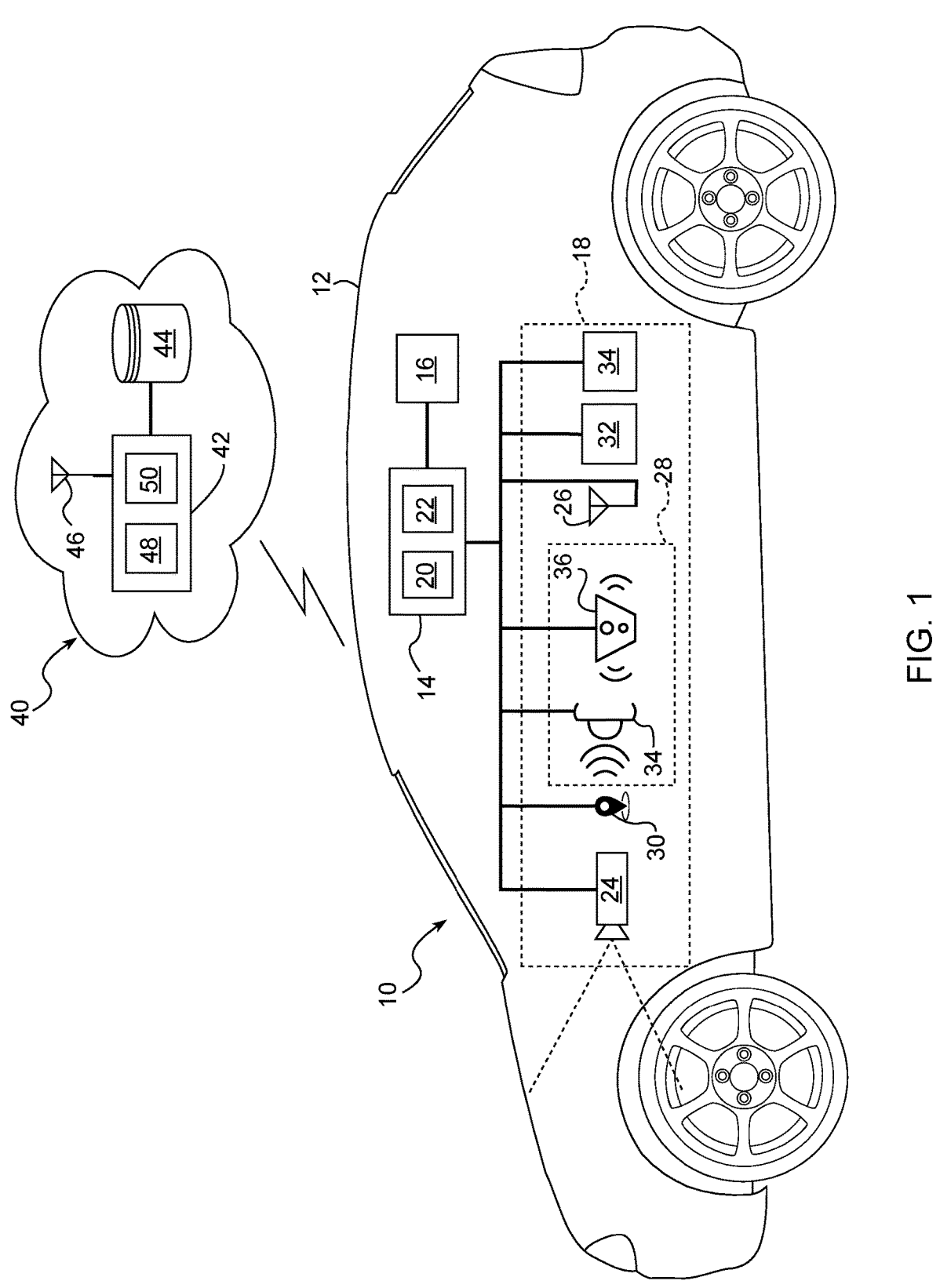
FIG. 1 is a schematic diagram of a system for identifying a region of interest in an environment surrounding a vehicle, according to an exemplary embodiment.

Referring to FIG. 1, a system for identifying a region of interest in an environment surrounding a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a vehicle graphics processing unit (GPU) 16, and a plurality of vehicle sensors 18.

The vehicle controller 14 is used to implement methods 200 and 300 for identifying a region of interest in an environment surrounding a vehicle, as will be described below. The vehicle controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the vehicle graphics processing unit (GPU) 16 and the plurality of vehicle sensors 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The vehicle graphics processing unit (GPU) 16 is used to facilitate and/or accelerate processing of graphics-intensive computational tasks. In an exemplary embodiment, the GPU includes one or more GPU processors and a video memory. In a non-limiting example, the one or more GPU processors are configured to process multiple parallel tasks simultaneously. In a non-limiting example, the one or more processors may include multiple processing cores. In another non-limiting example, the one or more GPU processors includes one or more field programmable gate arrays (FPGA) configured to perform graphics processing tasks.

The video memory is used to store, buffer, and/or cache video data before, during, and/or after processing with the one or more GPU processors. In a non-limiting example, the video memory is a type of volatile, high-speed memory. In some embodiments, the vehicle GPU 16 further may include additional memory devices such as PROMs (programmable read-only memory), EPROMs (electrically PROM), EEPROMs (electrically erasable PROM), flash memory, and/or the like for storing software and/or firmware.

It should be understood that the vehicle GPU 16 may include multiple graphics processing units in electrical communication with each other. It should be understood that the vehicle GPU 16 may be integrated with the vehicle controller 14 (e.g., on a same circuit board with the vehicle controller 14 or otherwise a part of the vehicle controller 14) without departing from the scope of the present disclosure. The vehicle GPU 16 is in electrical communication with the vehicle controller 14, as discussed above.

The plurality of vehicle sensors 18 are used to acquire information relevant to the vehicle 12. In an exemplary embodiment, the plurality of vehicle sensors 18 includes at least a camera 24, a vehicle communication system 26, a perception sensor 28, a global navigation satellite system (GNSS) 30, a vehicle input device 32, and a vehicle dynamics sensor 34.

The camera 24 is a perception sensor used to capture images and/or videos of the environment surrounding the vehicle 12. In an exemplary embodiment, the camera 24 includes a photo and/or video camera which is positioned to view the environment surrounding the vehicle 12. In a non-limiting example, the camera 24 includes a camera affixed inside of the vehicle 12, for example, in a headliner of the vehicle 12, having a view through the windscreen. In another non-limiting example, the camera 24 includes a camera affixed outside of the vehicle 12, for example, on a roof of the vehicle 12, having a view of the environment in front of the vehicle 12.

In another exemplary embodiment, the camera 24 is a surround view camera system including a plurality of cameras (also known as satellite cameras) arranged to provide a view of the environment adjacent to all sides of the vehicle 12. In a non-limiting example, the camera 24 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera 24 further includes an additional rear-view camera mounted near a center high mounted stop lamp of the vehicle 12.

In an exemplary embodiment, the vehicle controller 14 is capable of using the camera 24 to capture images in multiple resolutions. In a first embodiment, the vehicle controller 14 uses the camera 24 to capture images in a second image resolution (e.g., 1920×1080). The vehicle controller 14 then down samples the images to a first image resolution (e.g., 960×540) to conserve computational, networking, and/or storage resources. Therefore, in the first embodiment, it is possible to obtain higher-resolution images by retaining the images originally captured in the second image resolution without down sampling. In the first embodiment, the first image resolution is less than the second image resolution and the second image resolution is less than or equal to a maximum image resolution of the camera 24 (i.e., a maximum image resolution that the camera 24 is capable of capturing). In a second embodiment, the vehicle controller 14 uses the camera 24 to capture images directly in the first image resolution (for example, if the camera 24 is not capable of capturing images in the second image resolution). Therefore, in the second embodiment, it is not possible to obtain higher-resolution images without upscaling, as will be discussed in greater detail below. In the second embodiment, the first image resolution is equal to the maximum image resolution of the camera 24.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 26 is used by the vehicle controller 14 to communicate with other systems external to the vehicle 12. For example, the vehicle communication system 26 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 26 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like).

Accordingly, the vehicle communication system 26 may further include an embedded universal integrated circuit card (eUICC) configured to store at least one cellular connectivity configuration profile, for example, an embedded subscriber identity module (eSIM) profile. The vehicle communication system 26 is further configured to communicate via a personal area network (e.g., BLUETOOTH), near-field communication (NFC), and/or any additional type of radiofrequency communication. However, additional, or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system 26 may include one or more antennas and/or communication transceivers for receiving and/or transmitting signals, such as cooperative sensing messages (CSMs). The vehicle communication system 26 is configured to wirelessly communicate information between the vehicle 12 and another vehicle. Further, the vehicle communication system 26 is configured to wirelessly communicate information between the vehicle 12 and infrastructure or other vehicles. It should be understood that the vehicle communication system 26 may be integrated with the vehicle controller 14 (e.g., on a same circuit board with the vehicle controller 14 or otherwise a part of the vehicle controller 14) without departing from the scope of the present disclosure.

The perception sensor 28 is used to perceive objects and/or measure distances in the environment surrounding the vehicle 12. In an exemplary embodiment, the perception sensor 28 includes at least one of: a radar sensor 36 and a light detection and ranging (LiDAR) sensor 38.

The radar sensor 36 is used to detect and measure the distance, speed, and direction of objects by emitting radio waves and analyzing reflections of the radio waves. In an exemplary embodiment, the radar sensor 36 includes a radar transmitter, a radar antenna, a radar receiver, and a radar signal processing unit. In a non-limiting example, the radar transmitter emits radio frequency (RF) signals, which travel through space until they encounter an object. The RF signals bounce off the object's surface, return to the radar sensor 36. The radar receiver captures the reflected signals, and the radar signal processing unit analyzes the time delay, frequency shift, and amplitude of the returned RF signals to determine the distance, speed, and direction of the detected objects. The radar sensor 36 is in electrical communication with the vehicle controller 14, as discussed above.

The LiDAR sensor 38 is utilized for remote sensing and environmental mapping by emitting laser pulses and measuring the time it takes for the laser pulses to return to the LiDAR sensor 38 after hitting objects. In an exemplary embodiment, the LiDAR sensor 38 includes a LIDAR laser source, a LIDAR scanner or mirror, a LiDAR photodetector, and a LIDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 38 is in electrical communication with the vehicle controller 14, as discussed above.

In another exemplary embodiment, the perception sensor 28 further includes a stereoscopic camera having distance measurement capabilities. In one example, the perception sensor 28 is affixed inside of the vehicle 12, for example, in a headliner of the vehicle 12, having a view through a windscreen of the vehicle 12. In another example, the perception sensor 28 is affixed outside of the vehicle 12, for example, on a roof of the vehicle 12, having a view of the environment surrounding the vehicle 12. It should be understood that various additional types of perception sensors, such as, for example, ultrasonic ranging sensors and/or time-of-flight sensors are within the scope of the present disclosure. The perception sensor 28 is in electrical communication with the vehicle controller 14 as discussed above.

The GNSS 30 is used to determine a geographical location of the vehicle 12. In an exemplary embodiment, the GNSS 30 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna.

In an exemplary embodiment, the GNSS 30 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 30.

It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 30 may be integrated with the vehicle controller 14 (e.g., on a same circuit board with the vehicle controller 14 or otherwise a part of the vehicle controller 14) without departing from the scope of the present disclosure.

The vehicle input device 32 is used to receive inputs from an occupant of the vehicle 12. In the scope of the present disclosure, the occupant includes, in a non-limiting example, a driver, a passenger, and/or any additional persons in the vehicle 12. In an exemplary embodiment, the vehicle input device 32 includes mechanical and/or electromechanical buttons, switches, levers, knobs, or other control devices. In a non-limiting example, the vehicle input device 32 includes a brake pedal, an accelerator pedal, a steering wheel, a turn signal switch, and/or the like. In an exemplary embodiment, the vehicle input device 32 includes electrical and/or software buttons or switches which detect interaction from the occupant using capacitive touch or other touchscreen technology. In a non-limiting example, the vehicle input device 32 includes an infotainment touchscreen screen. In an exemplary embodiment, the vehicle input device 32 includes hands-free input devices, including, for example, a microphone for receiving voice commands, a camera or other sensor for receiving gesture commands, and/or the like. It should be understood that the vehicle input device 32 includes any device which the occupant may interact with within the vehicle 12 to control an operation of any aspect or system of the vehicle 12. The vehicle input device 32 is in electrical communication with the vehicle controller 14.

The vehicle dynamics sensor 34 is used to measure and monitor various parameters related to the motion and stability of the vehicle 12. In an exemplary embodiment, the vehicle dynamics sensor 34 includes one or more of: an accelerometer, a gyroscope, and/or a magnetometer. In a non-limiting example, the accelerometer measures linear acceleration, the gyroscope measures orientation and angular velocity, and the magnetometer detects an orientation of the vehicle 12 with respect to the Earth's magnetic field.

The accelerometer is used for measuring linear acceleration. In a non-limiting example, the accelerometer is a microelectromechanical system (MEMS) including a mass suspended on one or more springs. When the vehicle 12 undergoes acceleration, the mass is displaced, and the displacement of the mass is converted into an electrical signal. The gyroscope is used to measure orientation and angular velocity of the vehicle 12. In a non-limiting example, the gyroscope includes a spinning disk or vibrating crystal. When the vehicle 12 rotates, the gyroscope detects the Coriolis effect, producing an electrical signal proportional to the orientation and/or angular velocity. The magnetometer is used to detect the orientation of the vehicle 12 relative to the Earth's magnetic field. In a non-limiting example, the magnetometer uses Hall-effect sensors to measure changes in magnetic fields. It should be understood that the vehicle dynamics sensor 34 may include additional sensors, such as, for example, an inertial measurement unit (IMU), without departing from the scope of the present disclosure. The vehicle dynamics sensor 34 is in electrical communication with the vehicle controller 14.

In another exemplary embodiment, the plurality of vehicle sensors 18 further includes sensors to determine performance data about the vehicle 12. In a non-limiting example, the plurality of vehicle sensors 18 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 18 further includes additional sensors to determine information about an environment within the vehicle 12. In a non-limiting example, the plurality of vehicle sensors 18 further includes at least one of a seat occupancy sensor, a cabin air temperature sensor, a cabin motion detection sensor, a cabin camera, a cabin microphone, an occupant eye tracker, and/or the like.

In another exemplary embodiment, the plurality of vehicle sensors 18 further includes additional sensors to determine information about an environment surrounding the vehicle 12. In a non-limiting example, the plurality of vehicle sensors 18 further includes at least one of an ambient air temperature sensor, a barometric pressure sensor, and/or the like. The plurality of vehicle sensors 18 are in electrical communication with the vehicle controller 14 as discussed above.

With continued reference to FIG. 1, a remote server system is illustrated and generally indicated by reference number 40. The remote server system 40 includes a server controller 42 in electrical communication with a server database 44 and a server communication system 46. In a non-limiting example, the remote server system 40 is located in a server farm, datacenter, or the like, and connected to the internet.

The server controller 42 includes at least one server processor 48 and a server non-transitory computer readable storage device or server media 50. The description of the type and configuration given above for the vehicle controller 14 also applies to the server controller 42. In some examples, the server controller 42 may differ from the vehicle controller 14 in that the server controller 42 is capable of a higher processing speed, includes more memory, includes more inputs/outputs, and/or the like. In a non-limiting example, the server processor 48 and server media 50 of the server controller 42 are similar in structure and/or function to the processor 20 and the media 22 of the vehicle controller 14, as described above.

The server database 44 is used to store detailed maps of roadways, including, for example, information about lane boundaries, road geometry, speed limits, traffic signs, and/or other relevant features. In an exemplary embodiment, the server database 44 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 42 may execute software such as, for example, a database management system (DBMS), allowing data stored on the one or more mass storage devices to be organized and accessed.

The server communication system 46 is used to communicate with external systems, such as, for example, the vehicle controller 14 via the vehicle communication system 26. In a non-limiting example, server communication system 46 is similar in structure and/or function to the vehicle communication system 26, as described above. In some examples, the server communication system 46 may differ from the vehicle communication system 26 in that the server communication system 46 is capable of higher power signal transmission, more sensitive signal reception, higher bandwidth transmission, additional transmission/reception protocols, and/or the like.

Figure 2:
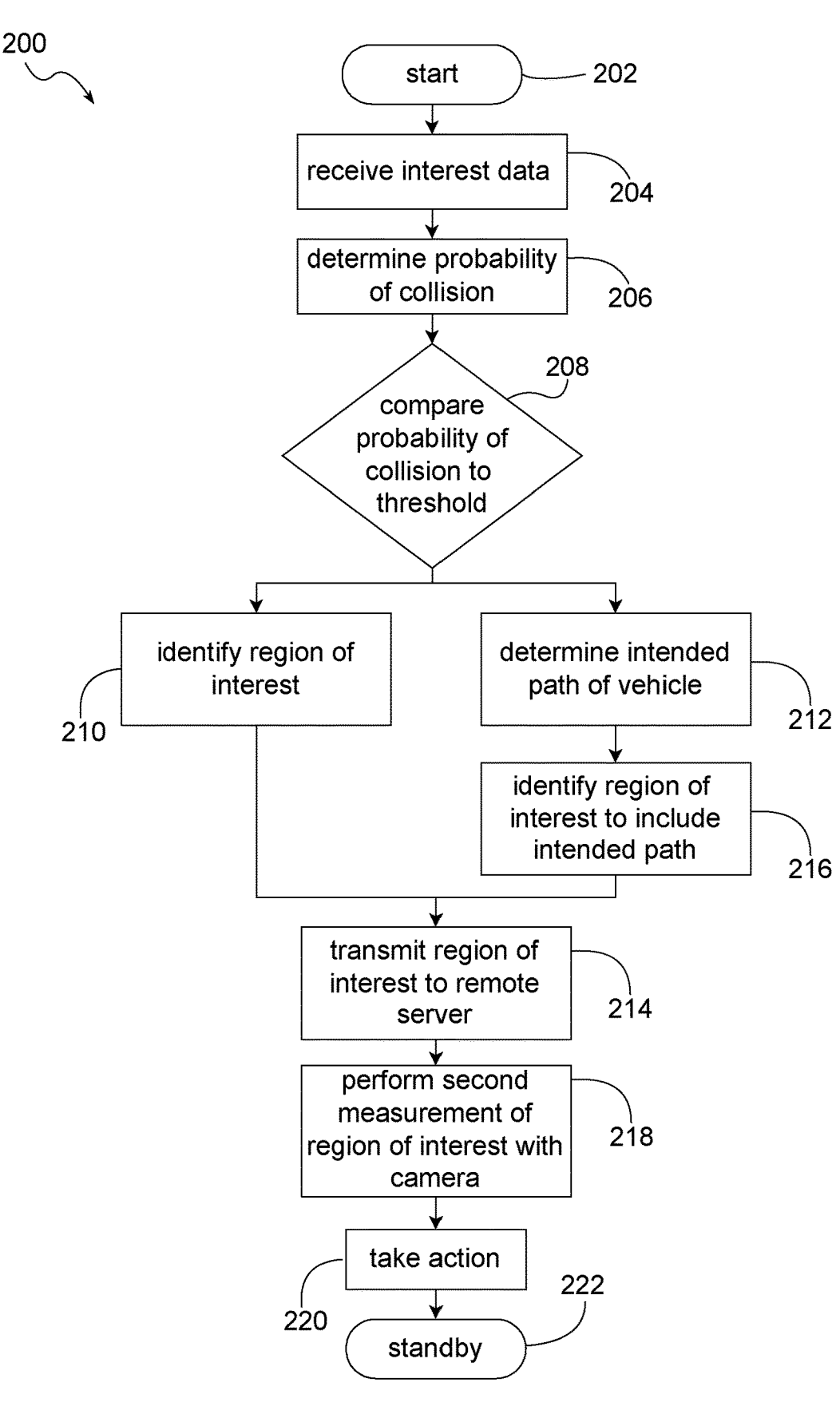
FIG. 2 is a flowchart of a first exemplary method for identifying a region of interest in an environment surrounding a vehicle, according to an exemplary embodiment.

Referring to FIG. 2, a flowchart of a first exemplary method 200 for identifying a region of interest in an environment surrounding a vehicle is provided. The first exemplary method 200 begins at block 202 and proceeds to block 204. At block 204, the vehicle controller 14 receives interest data. In the scope of the present disclosure, the interest data includes data relevant to a region of interest in the environment surrounding the vehicle 12. In an exemplary embodiment, the interest data includes a first measurement of the environment surrounding the vehicle performed using the perception sensor 28. In a non-limiting example, the first measurement is performed using the radar sensor 36. In another non-limiting example, the first measurement is performed using the LiDAR sensor 38. In an exemplary embodiment, the measurement includes, for example, a location of an object of interest relative to the vehicle 12 and/or a velocity of the object of interest relative to the vehicle 12. In the scope of the present disclosure, the object of interest is an object in the environment surrounding the vehicle 12 which may be relevant to the vehicle 12, for example, which may cause a collision with the vehicle 12. After block 204, the first exemplary method 200 proceeds to block 206.

At block 206, the vehicle controller 14 determines a probability of collision with the object of interest based at least in part on the first measurement performed at block 204. In an exemplary embodiment, to determine the probability of collision, the vehicle controller 14 first identifies the object of interest based on the first measurement. In a non-limiting example, the object of interest is a remote vehicle traveling on the roadway in the vicinity of the vehicle 12. In an exemplary embodiment, the vehicle controller 14 identifies the object of interest based on one or more of: a size, a location, a heading, and a velocity of multiple objects detected in the environment surrounding the vehicle 12.

The vehicle controller 14 then determines a predicted path of the object of interest based at least in part on the first measurement. In a non-limiting example, the predicted path of the object of interest is determined based on a location, velocity, and heading of the object of interest. In an exemplary embodiment, the predicted path of the object of interest includes a corresponding uncertainty value. The uncertainty of the predicted path of the object of interest quantifies a likelihood that the predicted path of the object of interest is correct. In some embodiments, the uncertainty of the predicted path of the object of interest provides additional information, such as a mathematical function describing a statistical probability of various deviations of the object of interest from the predicted path.

The vehicle controller 14 then determines a time-to-collision of the object of interest with the vehicle 12 based at least in part on the velocity of the vehicle 12, the velocity of the object of interest, and the predicted path of the object of interest. In an exemplary embodiment, the time-to-collision is determined based on a longitudinal distance between the vehicle 12 and the object of interest. The probability of collision is determined based at least in part on the uncertainty of the predicted path of the object of interest and the time-to-collision of the object of interest with the vehicle 12. In an exemplary embodiment, the probability of collision is determined based on a predicted lateral position of the object of interest relative to a predicted path of the vehicle 12. In a non-limiting example, the probability of collision is calculated using a deterministic algorithm, such as, for example a weighted average or other statistical metric. In another non-limiting example, the probability of collision is determined using a machine learning model trained to determine probability of collision based at least in part on the uncertainty of the predicted path of the object of interest and the time-to-collision of the object of interest with the vehicle 12. After block 206, the first exemplary method 200 proceeds to block 208.

At block 208, the vehicle controller 14 compares the probability of collision determined at block 206 to a predetermined collision probability threshold (e.g., ten percent). If the probability of collision is greater than or equal to the predetermined collision probability threshold, the first exemplary method 200 proceeds to block 210. If the probability of collision is less than the predetermined collision probability threshold, the first exemplary method 200 proceeds to block 212, as will be discussed in greater detail below.

At block 210, the vehicle controller 14 identifies a region of interest to include the object of interest in response to determining that the probability of collision is greater than or equal to the predetermined collision probability threshold at block 208. In the scope of the present disclosure, the region of interest is a region in the environment surrounding the vehicle 12 (i.e., a portion of the environment surrounding the vehicle 12) which is of interest for further sensor measurement, as will be discussed in greater detail below.

In an exemplary embodiment, the region of interest determined by the vehicle 12 is defined by vehicle region of interest parameters. In a non-limiting example, the region of interest parameters include, for example, two or more coordinates defining a bounding box (i.e., a location and size) of the region of interest and one or more GNSS coordinates where the region of interest is applicable. In an exemplary embodiment, to identify the region of interest to include the object of interest, the vehicle region of interest parameters are selected such that the location of the object of interest is within the region of interest.

In addition to adjusting the region of interest parameters to include the object of interest, the region of interest parameters may additionally be adjusted or controlled based on additional factors and parameters. In an exemplary embodiment, the region of interest parameters may be adjusted based on perception measures as determined with the vehicle sensors 18, for example, a number of static objects (i.e., nonmoving objects) in the environment surrounding the vehicle 12, a number of dynamic objects (i.e., moving objects) in the environment surrounding the vehicle 12, a scene complexity in the environment surrounding the vehicle 12, and/or an analysis of pixel changes (e.g., to identify static and dynamic areas of the environment surrounding the vehicle 12).

In another exemplary embodiment, the region of interest parameters may be adjusted based on environment measures as determined with the vehicle sensors 18, for example, a lighting of the environment surrounding the vehicle 12 (e.g., brightness measures based on the CIELAB color space approach), a weather of the environment surrounding the vehicle 12 (e.g., windscreen wiper status, detection of fog/mist based on fog lamp activation, and/or the like), a number and/or type of map features in the environment surrounding the vehicle 12 (e.g., a number of lanes, merge locations, crossing locations, and/or the like), a GNSS quality at the location of the vehicle 12 (e.g., 2D absolute position error, absolute velocity error, dilution of precision), a wireless connection quality at the location of the vehicle 12 (e.g., a signal strength, network type, level of service, and/or the like).

In another exemplary embodiment, the region of interest parameters may be adjusted based on additional factors, for example, the region of interest may have a defined maximum and minimum dimension. Furthermore, changes in size (i.e., expansion or contraction) of the region of interest may be governed by control parameters which limit the rate of change of size. For example, the control parameters may be configured to allow rapid expansion of the region of interest but slow contraction of the region of interest (i.e., a maximum allowed rate of expansion is greater than a maximum allowed rate of contraction). After block 210, the first exemplary method 200 proceeds to block 214, as will be discussed in greater detail below.

At block 212, the vehicle controller 14 determines an intended path of the vehicle 12 in response to determining that the probability of collision is less than the predetermined collision probability threshold at block 208. In an exemplary embodiment, to determine the intended path of the vehicle 12, the vehicle controller 14 receives one or more occupant inputs from an occupant of the vehicle using the vehicle input device 32. In a non-limiting example, the one or more occupant inputs includes a turn signal activation by the occupant. In an exemplary embodiment, the vehicle controller 14 may determine the intended path of the vehicle 12 to include a turn or a lane change based on turn signal activation. In another non-limiting example, the one or more occupant inputs includes a steering angle change (i.e., turning of the steering wheel by the occupant). In an exemplary embodiment, the vehicle controller 14 may determine the intended path of the vehicle 12 to include a turn or a lane change based on steering angle change. In another non-limiting example, the one or more occupant inputs includes an actuation of the brake pedal. In an exemplary embodiment, the vehicle controller 14 may determine the intended path of the vehicle 12 to include deceleration or stopping based on brake pedal actuation.

In another exemplary embodiment, to determine the intended path of the vehicle 12, the vehicle controller 14 performs one or more vehicle dynamics measurements with the vehicle dynamics sensor 34. In an exemplary embodiment, the one or more measurements includes an acceleration measurement, an angular velocity measurement, and/or a heading measurement. In an exemplary embodiment, the vehicle controller 14 determines the intended path of the vehicle 12 based on the one or more vehicle dynamics measurements. In an exemplary embodiment, to determine the intended path of the vehicle 12, the vehicle controller 14 determines a location of the vehicle 12 using the GNSS 30. In an exemplary embodiment, the vehicle controller 14 determines the intended path of the vehicle 12 based on the location of the vehicle 12 and/or the map information stored in the GNSS 30.

In another exemplary embodiment, to determine the intended path of the vehicle 12, the vehicle controller 14 uses one or more vehicle sensors 18. In an exemplary embodiment, the vehicle controller 14 uses an occupant eye tracker to determine a gaze direction of the occupant. In a non-limiting example, the gaze direction of the occupant is correlated with the intended path of the vehicle.

It should be understood that the intended path of the vehicle 12 may be determined based at least in part on any one or more of: the one or more occupant inputs, the one or more vehicle dynamics measurements, inputs from the vehicle sensors 18, and/or the location of the vehicle 12. It should further be understood that the vehicle controller 14 may utilize a deterministic algorithm and/or a machine learning based algorithm (e.g., a sensor fusion algorithm and/or the like) to process and interpret the one or more occupant inputs, the one or more vehicle dynamics measurements, and/or the location of the vehicle 12 to determine the intended path of the vehicle. After block 212, the first exemplary method 200 proceeds to block 216.

At block 216, the vehicle controller 14 identifies the region of interest to include the intended path of the vehicle 12 determined at block 212. In an exemplary embodiment, to identify the region of interest to include the intended path of the vehicle 12, the vehicle region of interest parameters are selected such that the location of the intended path of the vehicle 12 (or, in some examples, a portion of a field-of-view of the vehicle sensors 18 closest to the intended path of the vehicle 12) is within the region of interest. For example, if the intended path of the vehicle 12 includes a right turn, the region of interest may be configured to include a portion of the environment surrounding the vehicle 12 ahead and to the right of the vehicle 12. In addition to adjusting the region of interest parameters to include the intended path of the vehicle 12, the region of interest parameters may additionally be adjusted or controlled based on additional factors and parameters, as discussed above in reference to block 210. After block 216, the first exemplary method 200 proceeds to block 214.

At block 214, the vehicle controller 14 uses the vehicle communication system 26 to establish a connection with the server communication system 46 of the remote server system 40 and transmit the vehicle region of interest parameters determined at block 210 and/or block 216 and the location of the vehicle 12 (as determined using the GNSS 30) to the remote server system 40. In an exemplary embodiment, the server controller 42 uses the server communication system 46 to receive the vehicle region of interest parameters and the location of the vehicle 12 and aggregate the data in the server database 44. In a non-limiting example, the server controller 42 creates an aggregated, crowdsourced database of vehicle region of interest parameters corresponding to GNSS locations, as will be discussed in greater detail below. After block 214, the first exemplary method 200 proceeds to block 218.

At block 218, the vehicle controller 14 uses the camera 24 to perform a second measurement of the region of interest, as will be discussed in greater detail below. After block 218, the first exemplary method 200 proceeds to block 220.

At block 220, the vehicle controller 14 takes an action based at least in part on the second measurement performed at block 218. In an exemplary embodiment, the action includes performing a data processing task based at least in part on the second measurement. In the scope of the present disclosure, the data processing task includes, for example, an object detection and/or classification algorithm. For example, the data processing task may include detection of road geometry based on the second measurement. The action further may include transmission of information about detected features to the remote server system 40. For example, the object detection algorithm may detect a location of a lane line on a roadway, and the vehicle communication system 26 may be used to transmit the location of the lane line on the roadway to the remote server system 40 for storage, aggregation, and transmission to other vehicles. After block 220, the first exemplary method 200 proceeds to enter a standby state at block 222.

In an exemplary embodiment, the vehicle controller 14 repeatedly exits the standby state 222 and restarts the method 200 at block 202. In a non-limiting example, the vehicle controller 14 exits the standby state 222 and restarts the method 200 on a timer, for example, every three hundred milliseconds.

Figure 3:
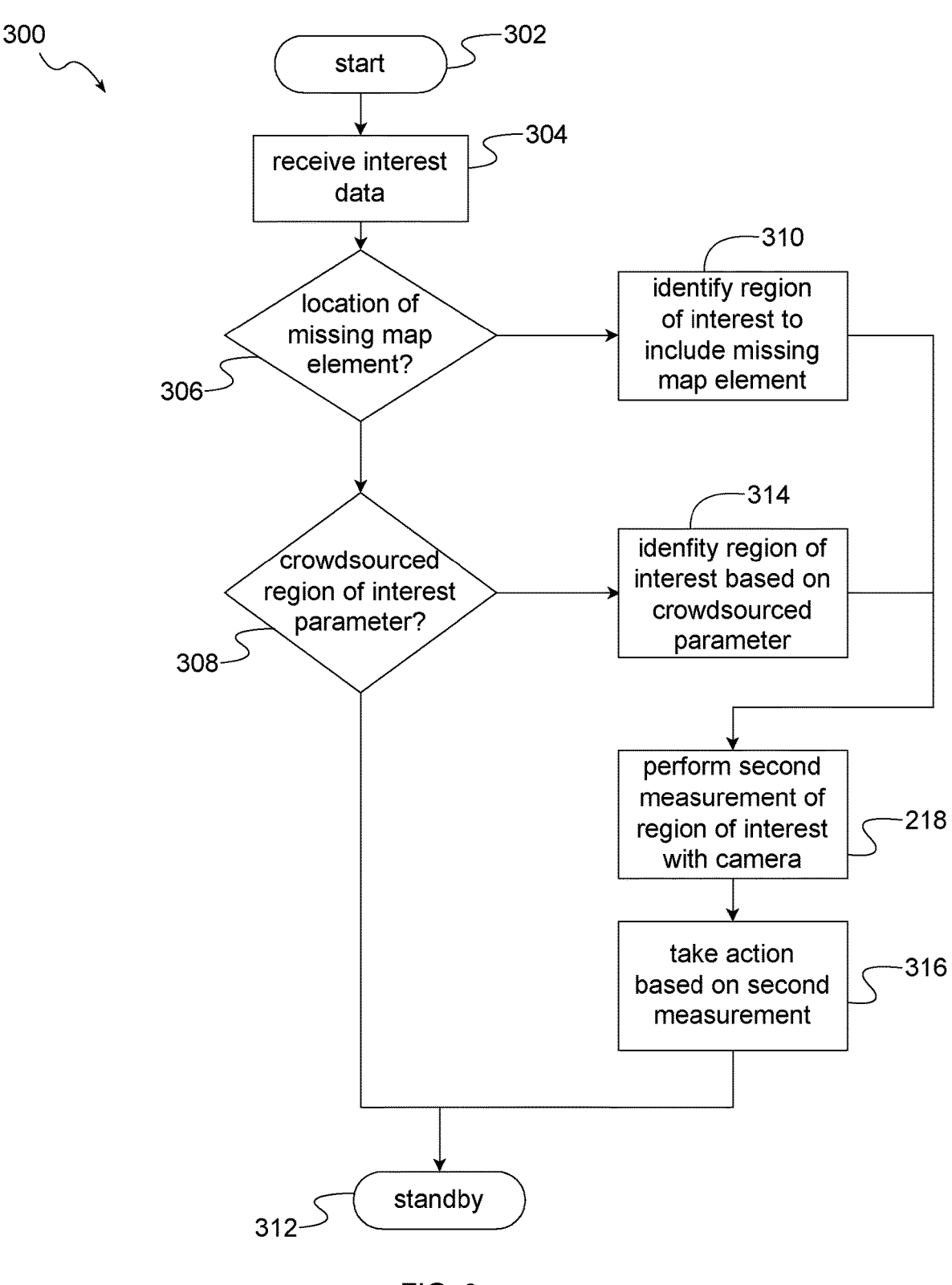
FIG. 3 is a flowchart of a second exemplary method for identifying a region of interest in an environment surrounding a vehicle, according to an exemplary embodiment.

Referring to FIG. 3, a flowchart of a second exemplary method 300 for identifying a region of interest in an environment surrounding a vehicle is provided. The second exemplary method 300 begins at block 302 and proceeds to block 304. At block 304, the vehicle controller 14 receives interest data. In an exemplary embodiment, the interest data includes one or more region cues transmitted by the remote server system 40 and received by the vehicle communication system 26. In the scope of the present disclosure, the one or more region cues include information about a requested location and/or size of the region of interest. In a non-limiting example, the one or more region cues include a location of a missing map element from the remote server system 40. For example, the one or more region cues may include approximate GNSS coordinates of a right road edge lane line which is known exist, but for which detailed data (e.g., exact location, size, color, type, etc.) is missing from a map stored in the server database 44.

In another non-limiting example, the vehicle controller 14 uses the vehicle communication system 26 to download a portion of a map (also referred to as a map tile) from the remote server system 40. The vehicle controller 14 then searches the map tile for missing map elements (e.g., missing lane line information, missing traffic sign information, missing lane configuration information, missing speed limit information, and/or the like) to identify the location of the missing map element.

In another non-limiting example, the one or more region cues may include a crowdsourced region of interest parameter. In the scope of the present disclosure, the crowdsourced region of interest parameter is a region of interest parameter determined by aggregating (e.g., averaging) vehicle region of interest parameters received from multiple vehicles for a GNSS coordinate. For example, due to unclear left edge road markings at an intersection, multiple vehicles may determine a region of interest near a left road edge at the intersection. The multiple vehicles then transmit the vehicle region of interest parameters along with the GNSS location to the remote server system 40 (see discussion of block 214 above). Therefore, the remote server system 40 determines the crowdsourced region of interest parameter based on an aggregation (e.g., an average or other statistical method) of the vehicle region of interest parameters received from the multiple vehicles. After receiving the one or more region cues at block 304, the second exemplary method 300 proceeds to block 306.

At block 306, if the one or more region cues received at block 304 does not include a location of a missing map element, the second exemplary method 300 proceeds to block 308, as will be discussed in greater detail below. If the one or more region cues received at block 304 includes a location of a missing map element, the second exemplary method 300 proceeds to block 310.

At block 310, the vehicle controller 14 identifies the region of interest to include the missing map element. In an exemplary embodiment, to identify the region of interest to include the missing map element, the vehicle region of interest parameters are selected such that the location of the missing map element is within the region of interest. In a non-limiting example, the vehicle controller 14 uses a computer vision algorithm (e.g., an object detection algorithm) to identify the missing map element using the vehicle sensors 18 and determine the location of the missing map element in the environment surrounding the vehicle 12. The vehicle controller 14 then determines the vehicle region of interest parameters such that the location of the missing map element is within the region of interest. In addition to adjusting the region of interest parameters to include the missing map element, the region of interest parameters may additionally be adjusted or controlled based on additional factors and parameters, as discussed above in reference to block 210. After block 310, the second exemplary method 300 proceeds to block 218, as will be discussed in greater detail below.

At block 308, if the one or more region cues received at block 304 does not include a crowdsourced region of interest parameter, the second exemplary method 300 proceeds to enter a standby state at block 312. If the one or more region cues received at block 304 includes a crowdsourced region of interest parameter, the second exemplary method 300 proceeds to block 314.

At block 314, the vehicle controller 14 identifies the region of interest based on the crowdsourced region of interest parameter. In an exemplary embodiment, two or more coordinates defining a bounding box (i.e., a location and size) of the region of interest are set based on the crowdsourced region of interest parameters. In a non-limiting example, crowdsourced region of interest parameter further includes one or more GNSS coordinates where the region of interest is applicable. Therefore, the region of interest described by the crowdsourced region of interest parameter is only applied when the vehicle 12 is within a predetermined distance threshold from the one or more GNSS coordinates. In addition to adjusting the region of interest parameters to include the crowdsourced region of interest parameter, the region of interest parameters may additionally be adjusted or controlled based on additional factors and parameters, as discussed above in reference to block 210. After block 314, the second exemplary method 300 proceeds to block 218, as will be discussed in greater detail below.

At block 218, the vehicle controller 14 uses the camera 24 to perform a second measurement of the region of interest as determined at block 310 or 314, as will be discussed in greater detail below. After block 218, the second exemplary method 300 proceeds to block 316.

At block 316, the vehicle controller 14 takes an action based at least in part on the second measurement performed at block 218. In an exemplary embodiment, the action includes performing a data processing task based at least in part on the second measurement. In the scope of the present disclosure, the data processing task includes, for example, an object detection and/or classification algorithm. For example, the data processing task may include detection of road geometry based on the second measurement. The action further may include transmission of information about detected features to the remote server system 40. For example, the object detection algorithm may detect a location of a lane line on a roadway, and the vehicle communication system 26 may be used to transmit the location of the lane line on the roadway to the remote server system 40 for storage, aggregation, and transmission to other vehicles. After block 316, the second exemplary method 300 proceeds to enter the standby state at block 312.

In an exemplary embodiment, the vehicle controller 14 repeatedly exits the standby state 312 and restarts the method 300 at block 302. In a non-limiting example, the vehicle controller 14 exits the standby state 312 and restarts the method 300 on a timer, for example, every three hundred milliseconds.

Figure 4:
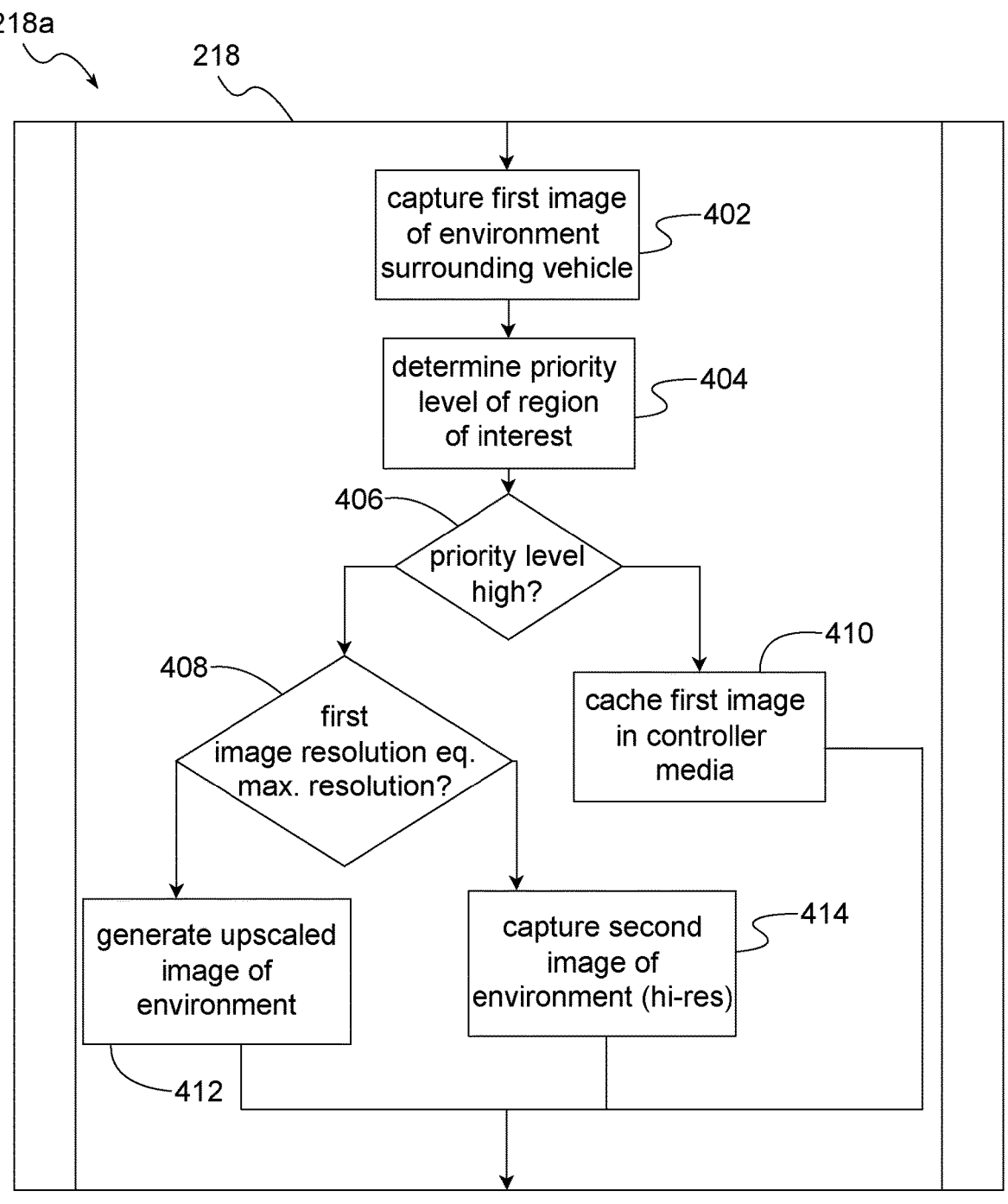
FIG. 4 is a flowchart of a method for performing a second measurement of the region of interest, according to an exemplary embodiment.

Referring to FIG. 4, a flowchart of an exemplary embodiment 218a of block 218 (i.e., a method for performing a second measurement of the region of interest) is shown. The exemplary embodiment 218a begins at block 402. At block 402, the vehicle controller 14 uses the camera 24 to capture a first image of the environment surrounding the vehicle 12. In an exemplary embodiment, the first image is captured using the first image resolution (e.g., 960×540). The first image includes at least the region of interest. After block 402, the exemplary embodiment 218a proceeds to block 404.

At block 404, the vehicle controller 14 determines a priority level of the region of interest. In the scope of the present disclosure, the priority level describes a time-sensitiveness of further processing of the region of interest. In a non-limiting example, the priority level includes, for example, a high priority level or a low priority level. In an exemplary embodiment, the priority level is determined based on a predetermined rule set (e.g., a lookup table). In a non-limiting example, if the region of interest is determined based on a probability of collision with the object of interest (e.g., as discussed in reference to the first exemplary method 200), the priority level is determined to be the high priority level. If the region of interest is determined based on a missing map element (e.g., as discussed in reference to the second exemplary method 300), the priority level is determined to be the low priority level. After block 404, the exemplary embodiment 218a proceeds to block 406.

At block 406, if the priority level determined at block 404 is the high priority level, the exemplary embodiment 218a proceeds to block 408, as will be discussed in greater detail below. If the priority level determined at block 404 is the low priority level, the exemplary embodiment 218a proceeds to block 410.

At block 410, the vehicle controller 14 caches the first image captured at block 402 in the media 22 of the vehicle controller 14. In an exemplary embodiment, the vehicle controller 14 further uses the camera 24 to capture a high-resolution image (i.e., a second image). The high-resolution image includes at least the region of interest. In an exemplary embodiment, the high-resolution image includes only the region of interest. In an exemplary embodiment, the high-resolution image includes only the region of interest. In an exemplary embodiment, the high-resolution image is captured using the second image resolution (e.g., 1920× 1080), where the second image resolution is higher than the first image resolution. The high-resolution image is also cached in the media 22 of the vehicle controller 14. In another exemplary embodiment, one or more of the first image and the high-resolution image are transmitted to the remote server system 40 using the vehicle communication system 26. The remote server system 40 saves the one or more of the first image and the high-resolution image in the server database 44 for later processing. After block 410, the exemplary embodiment 218a is concluded, and the methods 200, 300 proceed as discussed above.

At block 408, the vehicle controller 14 compares the first image resolution of the first image to the maximum image resolution of the camera 24. If the first image resolution is equal to the maximum image resolution of the camera 24 (i.e., if the vehicle controller 14 does not down sample images captured using the camera 24, as discussed above), the exemplary embodiment 218a proceeds to block 412, as will be discussed in greater detail below. In some embodiments, the comparison at block 408 is omitted and the exemplary embodiment 218a proceeds directly to block 412. If the first image resolution is less than the maximum image resolution of the camera 24 (i.e., if the vehicle controller 14 does down sample images captured using the camera 24, as discussed above), the exemplary embodiment 218a proceeds to block 414.

At block 414, the vehicle controller 14 uses the camera 24 to capture a high-resolution image of the environment surrounding the vehicle 12 (i.e., a second image). The high-resolution image includes at least the region of interest. In an exemplary embodiment, the high-resolution image includes only the region of interest. In an exemplary embodiment, the high-resolution image is captured using the second image resolution (e.g., 1920×1080), where the second image resolution is higher than the first image resolution. After block 414, the exemplary embodiment 218a is concluded, and the methods 200, 300 proceed as discussed above.

At block 412, the vehicle controller 14 uses the vehicle GPU 16 to generate an upscaled image of the environment surrounding the vehicle 12 (i.e., a second image). In the scope of the present disclosure, an upscaled image is an image having a higher resolution than an original image. In an exemplary embodiment, the upscaled image is generated based at least in part on the first image captured at block 402. In an exemplary embodiment, the upscaled image includes only the region of interest. In a non-limiting example, the upscaled image is generated using a machine learning super resolution algorithm executed using at least the vehicle GPU 16.

In an exemplary embodiment, the machine learning super resolution algorithm is used to enhance the resolution and quality of images using machine learning and/or artificial intelligence techniques. In a non-limiting example, the machine learning super resolution algorithm employs deep learning models, such as convolutional neural networks (CNNs), to upscale low-resolution content while enhancing visual details. In a non-limiting example, the machine learning super resolution algorithm is trained using a dataset of image pairs including high-resolution images and corresponding low-resolution images. The machine learning super resolution algorithm functions by taking a low-resolution image as input and generating a high-resolution output, predicting missing details in the image. After sufficient training, the machine learning super resolution algorithm is able to reconstruct fine textures and structures that are not present in the original low-resolution image. In an exemplary embodiment, the machine learning super resolution algorithm graphics processing and/or parallelization capabilities of the vehicle GPU 16 to increase a speed, accuracy, and/or efficiency of the image processing. After block 412, the exemplary embodiment 218a is concluded, and the methods 200, 300 proceed as discussed above.

The system 10 and methods 200, 300 of the present disclosure offer several advantages. Using the system 10 and methods 200, 300, the region of interest is dynamically adapted based on vehicle behavior, environmental conditions, and information received from the remote server system 40. By using the system 10 and methods 200, 300, performance of additional vehicle systems and features, such as, for example, object detection algorithms, collision avoidance features, and/or the like is increased due to dynamic adjustment of the region of interest. Use of the adaptive region of interest allows computational resources required for image upscaling or high-resolution image capture to be used efficiently to improve functioning of vehicle systems and features.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for identifying a region of interest in an environment surrounding a vehicle, the method comprising:

receiving interest data using a first vehicle sensor, wherein the interest data includes a first measurement, and wherein the first vehicle sensor includes at least one of: a radar sensor and a light detection and ranging (LIDAR) sensor;

determining an intended path of the vehicle;

identifying the region of interest in the environment surrounding the vehicle based at least in part on at least one of: the interest data and the intended path of the vehicle, wherein identifying the region of interest in the environment surrounding the vehicle further comprises:

identifying an object of interest in the environment surrounding the vehicle based at least in part on the first measurement;

determining a predicted path of the object of interest based at least in part on the first measurement;

calculating a time-to-collision of the object of interest with the vehicle based at least in part on the predicted path of the object of interest;

determining a probability of collision based at least in part on the predicted path of the object of interest, an uncertainty of the predicted path of the object of interest, and the time-to-collision of the object of interest with the vehicle; and identifying the region of interest to include the object of interest in response to determining that the probability of collision is greater than or equal to a prede-
termined collision probability threshold;
performing a second measurement of the region of inter-
est using a second vehicle sensor, wherein performing
the second measurement of the region of interest using
the second vehicle sensor further comprises:
capturing a first image of the environment surrounding
the vehicle using the second vehicle sensor, wherein
the first image has a first image resolution, wherein
the first image includes at least the region of interest,
and wherein the second vehicle sensor is a camera;
determining a priority level of the region of interest,
wherein the priority level includes at least one of: a
high priority level and a low priority level;
caching the first image in a non-transitory memory in
response to determining that the priority level is the
low priority level; and
generating a second image of the environment sur-
rounding the vehicle in response to determining that
the priority level is the high priority level, wherein
generating the second image further comprises:
comparing the first image resolution to a maximum
image resolution of the camera;
generating an upscaled image of the environment
surrounding the vehicle in response to determin-
ing that the first image resolution is equal to the
maximum image resolution of the camera,
wherein the upscaled image includes the region of
interest, and wherein the upscaled image of the
environment is upscaled using a machine learning
super resolution algorithm; and
capturing a high-resolution image of the environ-
ment surrounding the vehicle in response to deter-
mining that the first image resolution is less than
the maximum image resolution of the camera,
wherein the high-resolution image includes the
region of interest, wherein the high-resolution
image of the environment has a second image
resolution, and wherein the second image resolu-
tion is greater than the first image resolution; and
performing a data processing task based at least in part on
the second measurement, wherein the data processing
task includes detection of a lane line on a roadway; and
controlling a motion of the vehicle using a driver assis-
tance feature based at least in part on the lane line.
2. The method of claim 1, wherein identifying the region
of interest in the environment surrounding the vehicle fur-
ther comprises:
identifying an object of interest in the environment sur-
rounding the vehicle based at least in part on the first
measurement;
determining a predicted path of the object of interest
based at least in part on the first measurement;
calculating a time-to-collision of the object of interest
with the vehicle based at least in part on the predicted
path of the object of interest;
determining a probability of collision based at least in part
on the predicted path of the object of interest, an
uncertainty of the predicted path of the object of
interest, and the time-to-collision of the object of
interest with the vehicle; and
identifying the region of interest to include the object of
interest in response to determining that the probability
of collision is greater than or equal to a predetermined
collision probability threshold.
3. The method of claim 1, wherein determining the
intended path of the vehicle further comprises:

receiving one or more occupant inputs from an occupant
of the vehicle using one or more vehicle input devices;
performing one or more vehicle dynamics measurements
with one or more vehicle dynamics sensors;
determining a location of the vehicle using a global
navigation satellite system (GNSS); and
determining the intended path of the vehicle based at least
in part on at least one of: the one or more occupant
inputs, the one or more vehicle dynamics measure-
ments, and the location of the vehicle.
4. The method of claim 3, wherein identifying the region
of interest in the environment surrounding the vehicle fur-
ther comprises:
identifying the region of interest in the environment
surrounding the vehicle, wherein the region of interest
includes at least a portion of the intended path of the
vehicle.
5. The method of claim 1, wherein receiving interest data
further comprises:
receiving one or more region cues from a remote server
system, wherein the first measurement is the one or
more region cues.
6. The method of claim 5, wherein identifying the region
of interest in the environment surrounding the vehicle fur-
ther comprises:
identifying the region of interest in the environment
surrounding the vehicle based at least in part on the one
or more region cues, wherein the one or more region
cues includes a location of a missing map element from
the remote server system.
7. The method of claim 5, wherein identifying the region
of interest in the environment surrounding the vehicle fur-
ther comprises:
identifying the region of interest in the environment
surrounding the vehicle based at least in part on the one
or more region cues, wherein the one or more region
cues includes at least one crowdsourced region of
interest parameter, wherein the at least one crowd-
sourced region of interest parameter is determined by
the remote server system using crowdsourcing.
8. A system for identifying a region of interest in an
environment surrounding a vehicle, the system comprising:
a first vehicle sensor;
a second vehicle sensor, wherein the second vehicle
sensor includes a camera;
a vehicle graphics processing unit (GPU); and
a vehicle controller in electrical communication with the
first vehicle sensor, the second vehicle sensor, and the
vehicle GPU, wherein the vehicle controller is pro-
grammed to:
receive interest data using the first vehicle sensor;
identify the region of interest in the environment sur-
rounding the vehicle based at least in part on the
interest data; and
perform a second measurement of the region of interest
using the second vehicle sensor, wherein to perform
the second measurement of the region of interest
using the second vehicle sensor, the vehicle control-
ler is further programmed to:
capture a first image of the environment surrounding
the vehicle using the camera, wherein the first
image has a first image resolution, wherein the
first image includes at least the region of interest;
determine a priority level of the region of interest,
wherein the priority level includes at least one of:
a high priority level and a low priority level;

cache the first image in a non-transitory memory of the vehicle controller in response to determining that the priority level is the low priority level; and generate a second image of the environment surrounding the vehicle in response to determining that the priority level is the high priority level, wherein to generate the second image of the environment surrounding the vehicle, the vehicle controller is further programmed to:

compare the first image resolution to a maximum image resolution of the camera;

generate an upscaled image of the environment surrounding the vehicle in response to determining that the first image resolution is equal to the maximum image resolution of the camera, wherein the upscaled image includes the region of interest, and wherein the upscaled image of the environment is upscaled using a machine learning super resolution algorithm executed using the vehicle GPU; and capture a high-resolution image of the environment surrounding the vehicle in response to determining that the first image resolution is less than the maximum image resolution of the camera, wherein the high-resolution image includes the region of interest, wherein the high-resolution image of the environment has a second image resolution, and wherein the second image resolution is greater than the first image resolution;

perform a data processing task based at least in part on the second measurement, wherein the data processing task includes detection of a road geometry; and control a motion of the vehicle using an automated driving feature based at least in part on the road geometry.

9. The system of claim 8, wherein the first vehicle sensor includes a perception sensor, and wherein to receive interest data using the first vehicle sensor, the vehicle controller is further programmed to:

perform a first measurement using the perception sensor, wherein the interest data is the first measurement.

10. The system of claim 9, wherein to identify the region of interest in the environment surrounding the vehicle, the vehicle controller is further programmed to:

identify an object of interest in the environment surrounding the vehicle based at least in part on the first measurement;

determine a predicted path of the object of interest based at least in part on the first measurement;

calculate a time-to-collision of the object of interest with the vehicle based at least in part on the predicted path of the object of interest;

determine a probability of collision based at least in part on an uncertainty of the predicted path of the object of interest and the time-to-collision of the object of interest with the vehicle; and identify the region of interest to include the object of interest in response to determining that the probability of collision is greater than or equal to a predetermined collision probability threshold.

11. The system of claim 8, wherein the first vehicle sensor is a vehicle communication system, and wherein to receive interest data using the first vehicle sensor, the vehicle controller is further programmed to:

receive one or more region cues from a remote server system using the vehicle communication system, wherein the interest data is the one or more region cues; and transmit at least one vehicle region of interest parameter to the remote server system using the vehicle communication system for crowdsourcing by the remote server system.

12. The system of claim 11, wherein to identify the region of interest, the vehicle controller is further programmed to:

identify the region of interest in the environment surrounding the vehicle based at least in part on the one or more region cues, wherein the one or more region cues includes a location of a missing map element from the remote server system; and identify the region of interest in the environment surrounding the vehicle based at least in part on the one or more region cues, wherein the one or more region cues includes at least one crowdsourced region of interest parameter, wherein the at least one crowdsourced region of interest parameter is determined by the remote server system using crowdsourcing.

13. A method for identifying a region of interest in an environment surrounding a vehicle, the method comprising:

performing a first measurement of the environment surrounding the vehicle using a first vehicle sensor, wherein the first vehicle sensor is a perception sensor including at least one of: a radar sensor and a light detection and ranging (LIDAR) sensor;

identifying the region of interest in the environment surrounding the vehicle based at least in part on the first measurement, wherein identifying the region of interest in the environment surrounding the vehicle further comprises:

identifying an object of interest in the environment surrounding the vehicle based at least in part on the first measurement;

determining a predicted path of the object of interest based at least in part on the first measurement;

calculating a time-to-collision of the object of interest with the vehicle based at least in part on the predicted path of the object of interest;

determining a probability of collision based at least in part on an uncertainty of the predicted path of the object of interest and the time-to-collision of the object of interest with the vehicle; and identifying the region of interest to include the object of interest in response to determining that the probability of collision is greater than or equal to a predetermined collision probability threshold;

performing a second measurement of the region of interest using a second vehicle sensor, wherein the second vehicle sensor is a camera, wherein performing the second measurement of the region of interest using the second vehicle sensor further comprises:

capturing a first image of the environment surrounding the vehicle using the camera, wherein the first image has a first image resolution, wherein the first image includes at least the region of interest;

comparing the first image resolution to a maximum image resolution of the camera;

generating an upscaled image of the environment surrounding the vehicle in response to determining that the first image resolution is equal to the maximum image resolution of the camera, wherein the upscaled image includes the region of interest, and wherein the upscaled image of the environment is upscaled using a machine learning super resolution algorithm; and capturing a high-resolution image of the environment surrounding the vehicle in response to determining that the first image resolution is less than the maximum image resolution of the camera, wherein the high-resolution image includes the region of interest, wherein the high-resolution image of the environment has a second image resolution, and wherein the second image resolution is greater than the first image resolution;

performing a data processing task based at least in part on the second measurement, wherein the data processing task includes detection of a lane line on a roadway; and controlling a motion of the vehicle using a driver assistance feature based at least in part on the lane line.

\* \* \* \* \*